United States Patent Office 3,038,929
Patented June 12, 1962

3,038,929
ESTERS OF N-NITROSO-ACYLAMINOALKANOIC ACIDS
Hans K. Reimlinger, Brussels, Belgium, assignor to Union Carbide Corporation, a corporation of New York
No Drawing. Filed Aug. 11, 1959, Ser. No. 832,918
8 Claims. (Cl. 260—482)

This invention relates to novel compositions of matter and to a method for using the same. More particularly, this invention relates to novel esters of N-nitroso-acylaminoalkanoic acids which are useful as stable precursors for diazoacetic esters.

Diazoacetic esters are of considerable importance in many electrophilic and free-radical reactions. Typical of these reactions are those with halogens to give dihalogeno-derivatives, with carbonyl compounds leading to epoxy-compounds or to the addition of the

CH—R—COOR residue, and with unsaturated compounds leading to pyrazol or pyrazoline derivatives and the like. Further details concerning the reactions of diazoacetic esters can be found, for instance, in Traité de Chimie Organique, V. Grignard, vol. XV, p. 58, and subsequent Gilman, Advance Treatise of Organic Chemistry, vol. 1, p. 96 and subsequent L. I. Smith, Chemical Reviews, vol. 23 (1928) p. 210–211, R. Huisgen, Angew. Chemie 67 (1955), p. 439 and subsequent.

The preparation and storage of these esters, however, usually involves a considerable amount of risk and danger. Hence, it has been found desirable to replace the diazoacetic ester by a compound which, under proper conditions, can act as a precursor for the desired diazocompounds.

Many efforts have been devoted in the past to find compounds which could act as stable precursors for diazoacetic esters. They have been heretofore relatively unsuccessful, however. These efforts have led mainly to various improvements in the old Curtius' method for preparing diazoacetic esters. More recently, De Boer (Rec. Trav. Chim. Pays-Bas 73, 229, 582 (1954)) showed that diazomethane could be prepared from nitroso-alkyl-sulfamides. This reaction, however, cannot be applied to the preparation of diazoacetic esters, as shown by W. Kirmse and L. Horner (Berichte 89, J, 1674 (1956)). These authors have indeed found that the treatment of a compound such as nitroso-toluyl-sulfonyl-carboalkoxy-methylamide leads to a molecular rearrangement and to the formation of the corresponding oxime.

It has now been found that the novel esters of this invention overcome the difficulties of the prior art and are particularly useful as stable precursors for the desired diazo-compound.

These novel esters can be conveniently represented by reference to the general formula:

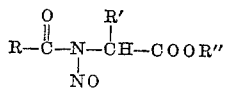

wherein R represents an alkyl group or hydrogen atom, R' represents an alkyl, carboalkoxy alkyl or aryl group or a hydrogen atom and R" represents a linear or branched alkyl or aryl group.

Since in forming a diazoacetic ester from a novel ester of this invention the R rest splits off during the reaction, a particularly preferred series of the novel esters of this invention are those compounds in which R is a methyl or ethyl group or a hydrogen atom.

The novel compounds of this invention can be prepared by reacting an ester of an acylaminoalkanoic acid as represented by the general formula:

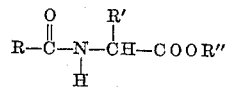

with nitrogen trioxide ($N_2O_3$) wherein R, R' and R" denote the same groups as hereinbefore defined.

The above reaction can be performed at a temperature of about 0° C. by passing a flow of gaseous nitrogen trioxide through a cold acetic solution (acetic acid and acetic anhydride, 1:1) of the ester of an acylaminoalkanoic acid until a dark blue-green solution is obtained. The blue-green solution is thereupon poured onto a mixture of water and ice-chips. This serves to remove the acetic acid. The nitroso compound is then dissolved in an inert organic solvent such as ether; the etheric phase is then neutralized by the addition of an aqueous solution of sodium bicarbonate and the compound is then dried over neutral calcium chloride (free of calcium oxide or base). Following this, the nitroso compound can be separated from the etheric solution by means such as distillation, precipitation or any other conventional means of fractionating. Preferably the ether is removed under vacuum, and the residue is distilled—whenever possible—under reduced pressure, i.e., 15 mm. of Hg or less.

The $N_2O_3$ reactant is conventionally obtained by decomposition of a nitrate with a strong dehydrating acid, such as sulfuric acid. In the above reaction, it is preferable to employ an excess of the nitrogen trioxide. The ester of an acylaminoalkanoic acid can be prepared by conventional esterification procedures described in the literature.

Typical esters of acylated amino-acids suitable for use in providing the novel compounds of this invention include:

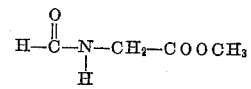

(Formyl glycocoll methyl ester)

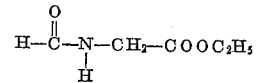

(Formyl glycocoll ether ester)

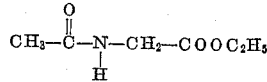

(Acetyl glycocoll ethyl ester)

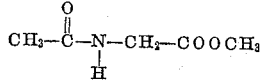

(Acetyl glycocoll methyl ester)

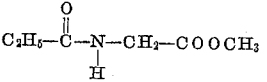

(Propionyl glycocoll methyl ester)

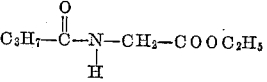

(Butyryl glycocoll ethyl ester)

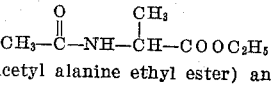

(Acetyl alanine ethyl ester) and $$\underset{\text{(Acetyl aspartic dimethyl ester)}}{\overset{\text{O}}{\underset{\|}{\text{CH}_3-\text{C}}}-\text{NH}-\underset{\overset{|}{\text{CH}_2-\text{COOCH}_3}}{\text{CH}}-\text{COOCH}_3}$$

In the procedure described above for the reaction of the aforementioned starting materials, a variety of the novel esters of this invention are readily prepared and include:

$$\underset{\text{(N-nitroso-N-acetyl glycocoll ethyl ester)}}{\overset{\text{O}}{\underset{\|}{\text{CH}_3-\text{C}}}-\underset{\overset{|}{\text{NO}}}{\text{N}}-\text{CH}_2-\text{COOC}_2\text{H}_5}$$

$$\underset{\text{(N-nitroso-N-formyl glycocoll methyl ester)}}{\overset{\text{O}}{\underset{\|}{\text{H}-\text{C}}}-\underset{\overset{|}{\text{NO}}}{\text{N}}-\text{CH}_2-\text{COOCH}_3}$$

$$\underset{\text{(N-nitroso-N-acetyl glycocoll methyl ester)}}{\overset{\text{O}}{\underset{\|}{\text{CH}_3-\text{C}}}-\underset{\overset{|}{\text{NO}}}{\text{N}}-\text{CH}_2-\text{COOCH}_3}$$

$$\underset{\text{(N-nitroso-N-formyl glycocoll ethyl ester)}}{\overset{\text{O}}{\underset{\|}{\text{H}-\text{C}}}-\underset{\overset{|}{\text{NO}}}{\text{N}}-\text{CH}_2-\text{COOC}_2\text{H}_5}$$

$$\underset{\text{(N-nitroso-N-propionyl glycocoll methyl ester)}}{\overset{\text{O}}{\underset{\|}{\text{C}_2\text{H}_5-\text{C}}}-\underset{\overset{|}{\text{NO}}}{\text{N}}-\text{CH}_2-\text{COOCH}_3}$$

$$\underset{\text{(N-nitroso-N-butyryl glycocoll ethyl ester)}}{\overset{\text{O}}{\underset{\|}{\text{C}_3\text{H}_7-\text{C}}}-\underset{\overset{|}{\text{NO}}}{\text{N}}-\text{CH}_2-\text{COOC}_2\text{H}_5}$$

$$\underset{\text{(N-nitroso-N-acetyl alanine ethyl ester)}}{\overset{\text{O}}{\underset{\|}{\text{CH}_3-\text{C}}}-\underset{\overset{|}{\text{NO}}}{\text{N}}-\overset{\overset{\text{CH}_3}{|}}{\text{CH}}-\text{COOC}_2\text{H}_5} \text{ and}$$

$$\underset{\text{(N-nitroso-N-acetyl aspartic dimethyl ester)}}{\overset{\text{O}}{\underset{\|}{\text{CH}_3-\text{C}}}-\underset{\overset{|}{\text{NO}}}{\text{N}}-\underset{\overset{|}{\text{CH}_2-\text{COOCH}_3}}{\overset{\overset{\text{H}}{|}}{\text{C}}}-\text{COOCH}_3}$$

As mentioned heretofore, the novel esters of this invention, and in particular those esters in which R is a methyl, or ethyl group or a hydrogen atom act as stable precursors for the one-step preparation of a diazoacetic ester. Said stable precursors can be stocked, provided there is no alkali present, in large quantities and with comparative safety for extended periods of time.

The one-step preparation of the diazoacetic esters from the stable precursors of this invention can be represented by the following illustrative equation:

$$\text{R}-\underset{\overset{\|}{\text{O}}}{\text{C}}-\underset{\overset{|}{\text{NO}}}{\text{N}}-\overset{\overset{\text{R}'}{|}}{\text{CH}}-\text{C}\overset{\overset{\text{O}}{\diagup}}{\underset{\text{OR}''}{\diagdown}} \xrightarrow[\text{base}]{\text{R}'''\text{OH}}$$

$$\overset{(-)\ (+)}{[\text{N}=\text{N}]}=\overset{\overset{\text{R}'}{|}}{\text{C}}-\text{C}\overset{\overset{\text{O}}{\diagup}}{\underset{\text{OR}''}{\diagdown}} + \text{R}-\overset{\overset{\text{O}}{\|}}{\text{C}}-\text{OR}''' + \text{H}_2\text{O}$$

wherein R''' represents an alkyl radical or a hydrogen atom and wherein R, R' and R'' denote the same groups as hereinbefore indicated.

It is desirable that the R'' substituent be such as to make the $$-\overset{\overset{\text{R}'}{|}}{\underset{\overset{|}{\text{H}}}{\text{C}}}-\text{C}\overset{\overset{\text{O}}{\diagup}}{\underset{\text{OR}''}{\diagdown}}$$

group of the starting material alkali resistant. If this group is not resistant to alkaline saponification, the yield of diazoacetic ester is considerably reduced by the occurrence of side reactions when a strong alkaline reagent is employed.

However, it has been found that at least comparable results will also be found when R'' is not an alkali-resistant group, provided the reaction is performed in relatively mild and well-controlled alkaline conditions. For example, using a mixture of barium hydroxide and barium oxide in a ratio of about 10 to 25:90 to 75 respectively wherein the quantity of barium hydroxide is just sufficient to initiate the reaction, the undesirable side reactions mentioned above will also be avoided and a good yield of product will result. This is because the water formed by the reaction (as shown above) will in turn facilitate the saponification and generation of a new quantity of barium hydroxide. This will, therefore, keep the reaction in the desired direction. In this case the whole process is performed under almost anhydrous conditions since the water formed during the process is immediately used in the reaction itself.

In the above reactions stoichiometric amounts of base should be employed. When non-stoichiometric quantities of base, i.e., excess of or less than stoichiometric are employed, it has generally been found that the percent yield of the diazoacetic ester is reduced substantially.

The above reaction should be carried out at a temperature of between −10° C. and 10° C. It is preferable, however, to carry out the reaction at a temperature of about 0° C.

In general, the above alkaline splitting should be performed in a polar solvent, i.e., alcohols and mixtures of alcohols and ethers. A large quantity of water is not desirable, since it promotes excessive saponification and corresponding undesirable side reactions.

Among the bases that may be employed are relatively concentrated aqueous solutions of NaOH or KOH, alcoholic solutions of sodium or potassium alcoholates or the aforementioned mixture of Ba(OH)$_2$+BaO in suspension in ether.

The product diazoacetic ester is thereupon obtained by standard fractionating and distilling procedures.

EXAMPLE 1

*Preparation of N-Nitroso-N' Acetyl Glycocoll Ethyl Ester*

In a two-necked bottle, 100 grams of the ethyl ester of glycocollic acid were dissolved in a mixture of 50 cc. acetic acid and 50 cc. acetic anhydride. A flow of gaseous nitrogen trioxide was passed through the resulting mixture until a dark blue-green solution was obtained. This blue solution was poured onto a 100 cc. mixture of water and ice chips. Five hundred cc. ether was thereupon added to it. The etheric phase was neutralized by means of sodium bicarbonate and was then dried over neutral calcium chloride (free of CaO or base). Finally, the ether was removed and residue was distilled off at 100° C. under 15 mm. Hg.

Analysis of the ester formed gave the following results:

|  | N | C | H |
|---|---|---|---|
| calculated percent | 16.09 | 41.38 | 5.79 |
| found percent | 16.07 | 41.90 | 5.77 |

An orange-red liquid was obtained which shows an index of refraction $n_{20}^D$=1.444. This liquid gave a positive reaction to the Liebermann test whereby showing the presence of a nitroso group.

The yield of product obtained was found to be 83%.

The Liebermann reaction is a color reaction for the identification of nitroso group. It consists of the addition of a crystal of phenol +5 cc. of concentrated $H_2SO_4$ to the substance to be tested. When this mixture is poured into water a red solution is obtained due to the formation of a nitroso-phenol. The red color changes to blue on the addition of an alkali.

EXAMPLE 2

Preparation of Diazoacetic Ester 20 grams of the final product of Example 1 was dissolved in 300 cc. ether and 150 cc. ethanol, using a 500 ml. round flask. This mixture was then cooled at 0° C. To this mixture, 10 grams of KOH solution dissolved in 100 ml. of ethanol was then added in dropwise fashion. During this addition, a mixture of colorless inorganic and organic compounds was precipitated.

After filtration of this precipitate and as soon as the Liebermann test was negative 800 cc. of ether was added to the reaction mixture, washed several times by means of icy water to neutrality and dried over sodium sulfate. The ether was then distilled off and the residue was, in turn, also distilled off under reduced pressure at 48–50° C. at 15 mm. Hg. The final product was identified as ethyldiazoacetate; the yield was about 40%.

EXAMPLE 3

Preparation of N.Nitroso.N'Formyl Glycocoll Methyl Ester

Employing the equipment of Example 1, 26.2 grams of the formyl ester of glycocoll acid was dissolved in a mixture of 20 cc. of acetic acid and 30 cc. of acetic anhydride. A flow of gaseous nitrogen trioxide ($N_2O_3$) was passed through the resulting mixture until a dark blue solution was obtained.

The blue solution was then poured onto a mixture of 150 cc. of ice chips and of 150 cc. ethanol. Four hundred cc. ether, was thereupon added; the ether phase was then washed with water and sodium bicarbonate to neutrality and was dried over sodium sulfate. The ether was then distilled off under reduced pressure at 0° C. The residual product could not be purified by distillation since it decomposed at about 50° C. at 17 mm. Hg. This unpurified product appeared as an organge-red liquid. This very mobile liquid was identified as a nitroso-compound by means of the Liebermann test.

EXAMPLE 4

Preparation of Methyl Diazoacetate

Nineteen grams of the final product of Example 3 was dissolved in a mixture of 200 cc. ether and 50 cc. ethanol at 0° C. 25 cc. of a N solution of KOH in methanol was added dropwise to this mixtupre at 0° C. The mixture was then washed several times with icy water to neutrality and the etheric phase was dried over sodium sulfate. The ether was then distilled off under reduced pressure at 0° C. Following this, the residue was then also distilled off at 72° C. under 80 mm. Hg. The product was identified as methyl diazoacetate; the yield was about 20%.

It should be noted that the diazoacetic esters are identifiable in a number of ways. In the present instance two main tests were employed to identify the final reaction products:

(1) The discoloration of an iodine solution with the simultaneous evolution of $N_2$, and (2) The formation of pyrazol tricarboxylic ester by reaction of the product ester with acetylene dicarboxylic ester resulting in a yield of 95%.

EXAMPLE 5

Preparation of N-Nitroso-N-Acetyl Glycocoll Tertiary Butyl Ester (A) An acetyl glycocoll tertiary butyl ester was prepared by refluxing a silver salt of the acetyl glycocoll acid for 12 hours in tertiary butyl chloride, which was used as a solvent. Ether was then added to the reaction mixture and the latter was filtered off leaving the precipitated silver salt. The etheric phase was then washed with sodium bicarbonate, and was dried over calcium chloride. By distillation at 100–108° C. under reduced pressure (1 mm. of Hg) the desired reaction product was obtained as a colorless liquid.

Analysis of the acetyl glycocoll tertiary butyl ester having the structure $CH_3CONHCH_2COOC(CH_3)_3$, gave the following results:

|   | calculated (percent) | found (percent) |
| --- | --- | --- |
| C | 55.48 | 55.73 |
| H | 8.73 | 8.54 |
| N | 8.08 | 8.18 |

(B) 14.5 grams of the previous reaction product were dissolved in a mixture of 30 cc. acetic anhydride and 25 cc. acetic acid. A flow of $N_2O_3$ was then passed through the reaction mixture until a dark blue solution was obtained. This blue solution was then poured onto a mixture of 50 cc. methanol and 200 grams of icy water (i.e., containing ice chips). A red solution resulted which was extracted by means of ether. The etheric phase was then neutralized with sodium bicarbonate and was dried over calcium chloride. The etheric solvent was finally evaporated under vacuum at 0° C. whereby a red liquid resulted which could not be distilled.

EXAMPLE 6

Preparation of Tertiary Butyl Diazoacetate 10 grams of the reaction product obtained by means of the process described in Example 5b above was dissolved at 0° C. in a mixture of 50 cc. ether and 25 cc. ethanol. This mixture was then cooled at −15° C. A solution of 5 grams KOH dissolved in 50 ml. ethanol was then added in dropwise fashion. A yellow solution resulted which was maintained at −5° C. until the Liebermann test was negative (this was achieved in about 5 minutes).

100 cc. ether was then added to the reaction mixture which was neutralized by means of water at 0° C., dried over calcium chloride and filtered. The solvent was evaporated on a boiling water bath. The yellow residue was then removed as steam under reduced pressure (15 mm. of Hg); the distillate so obtained being extracted with ether. The etheric phase was then dried over calcium chloride, filtered and finally evaporated at room temperature. A yellow liquid resulted which was identified as tertiary butyl diazoacetate

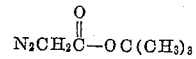

The yield was about 80%. Analysis of the reaction product gave the following results:

|   | calculated (percent) | found (percent) |
| --- | --- | --- |
| C | 50.69 | 50.61 |
| H | 7.09 | 7.01 |
| N | 19.71 | 19.64 |

EXAMPLE 7

Preparation of Diazoacetic Ester

A solution of 9.6 grams of N.nitroso-N.acetyl glycocoll ethyl ester (as prepared in Example 1) in 50 cc. of absolute methanol was added under stirring to a suspension of a mixture consisting of 4 g. of BaO and 0.8 g. of Ba(OH)$_2$—8H$_2$O in 250 cc. of absolute ether. This addition was performed at a temperature of —10° C. to 0° C. After completion of the addition, the cooling bath was removed and the reaction mixture allowed to stay for about 4½ hours, i.e., until the Liebermann test shows a negative reaction. The solution was then filtered, washed with water and the ether phase separated and dried.

After evaporation of the ether, the liquid residue was distilled under vacuum (the liquid residue had a boiling point 46–48° C. at 10 mm. of Hg) and was identified as diazoacetic ester. The total yield of the diazoacetic ester was 60%.

EXAMPLE 8

Preparation of Diazosuccinic ester (A) Preparation of the acetyl aspartic dimethyl ester: 5 g. of dimethyl ester of aspartic acid was dissolved in 10 cc. of benzene. To that solution there was then added, dropwise, and under stirring, 5 g. of acetic anhydride. The reaction was exothermic. The system was allowed to stand overnight. Following this, the benzene and the excess of acetic anhydride was thereupon distilled. The residue was then distilled under vacuum (129–131° C. at 0.05 mm. of Hg). The melting point of the product obtained thereby was 73–74° C. The yield obtained was 80%.

Analysis of the product gave the following results:

|   | calculated (percent) | found (percent) |
|---|---|---|
| C | 47.29 | 47.67 |
| H | 6.40 | 6.46 |

(B) Preparation of N-nitroso-N acetyl aspartic dimethyl ester: The process employed was identical to that described in Example 1, except that 12 g. of acetyl aspartic dimethyl ester was used. Moreover, the residue was distilled off under vacuum (72° C.—0.1 mm. of Hg).

Analysis of the product obtained thereby gave the following results:

|   | calculated (percent) | found (percent) |
|---|---|---|
| N | 16.10 | 16.32 |

The orange liquid so obtained gave a positive reaction to the Liebermann test, thereby showing the presence of a nitroso group.

(C) Preparation of the ester diazo-succinic: 23.2 g. of the product obtained in 8(B) above were dissolved in a mixture of 200 cc. of ether and 150 cc. of ethanol at 0° C. To this solution, there was added, dropwise and under stirring, a solution of 5.6 g. of KOH in 50 cc. of ethanol while the temperature of the reaction vessel was maintained at between 0 and 10° C. Stirring was continued until the Liebermann test shows a negative reaction. The reaction mixture was then extracted with ether, washed with water up to neutrality and dried; after elimination of the ether, the residue appeared as a yellow liquid which showed the characteristic properties of the ester diazosuccinic. The total yield obtained was 35%. The final product could not be distilled at 0.1 mm. of Hg.

EXAMPLE 9

Preparation of Alpha Methyl Diazoacetic Ester (A) Preparation of the N-nitroso-N acetyl alanine ethyl ester: The process steps employed were identical to those described in Example 1 except that 50 g. of acetyl alanine ethyl ester was used. After elimination of the ether, the residue appeared as an orange-red liquid which showed a positive reaction to the Liebermann test. The yield obtained was 72%.

(B) A solution of 19 g. of the compound obtained in 9(A) in 100 cc. of methanol was added in dropwise fashion and under stirring, to a suspension consisting of a mixture of 4.4 g. of Ba(OH)$_2$ and 4.4 g. of BaO in 500 cc. of ether. This reaction was carried out at 0° C. and the system was maintained under stirring until the Liebermann test showed a negative reaction. The operation was then performed as in the previous examples and led to a non-distillable yellow liquid identified as the α-methyl diazoacetate.

What is claimed is:

1. A compound of the formula:

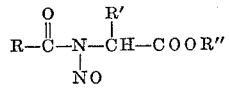

wherein R represents a member selected from the group consisting of methyl, ethyl and propyl and a hydrogen atom, R' represents a member selected from the group consisting of methyl, ethyl and carbomethoxy methyl and a hydrogen atom, and R'' is alkyl of 1 to 4 carbons.

2. The compound, N-nitroso-N-acetyl glycocoll methyl ester.

3. The compound, N-nitroso-N-formyl glycocoll methyl ester.

4. The compound, N-nitroso-N-propionyl glycocoll methyl ester.

5. The compound, N-nitroso-N-acetyl glycocoll ethyl ester.

6. The compound, N-nitroso-N-formyl glycocoll ethyl ester.

7. The compound, N-nitroso-N-propionyl glycocoll ethyl ester.

8. The compound, N-nitroso-N-acetyl glycocoll tertiary butyl ester.

References Cited in the file of this patent

UNITED STATES PATENTS

| 2,490,714 | Searle | Dec. 6, 1949 |
| 2,691,649 | Hammond | Oct. 12, 1954 |
| 2,691,650 | Hammond | Oct. 12, 1954 |

OTHER REFERENCES

McKay: J. Am. Chem. Soc., vol. 70, pp. 1974–5 (1948).